E. G. MENZENWERTH.
PISTON RING.
APPLICATION FILED MAR. 24, 1921.
1,406,054.
Patented Feb. 7, 1922.
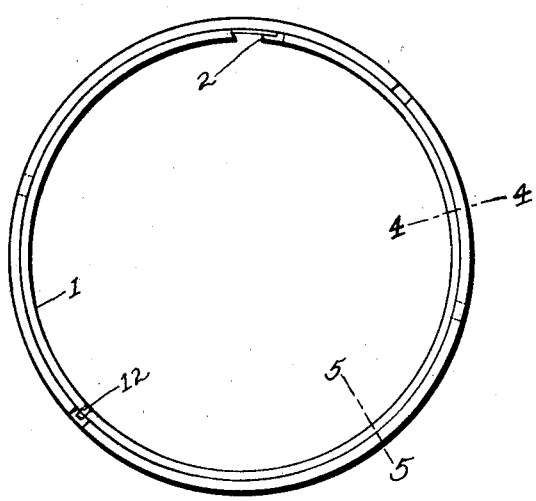
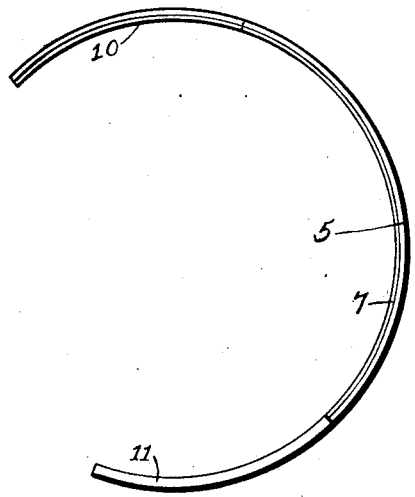
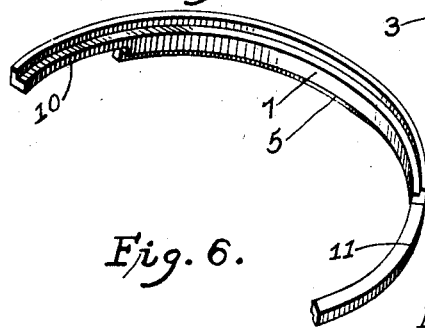
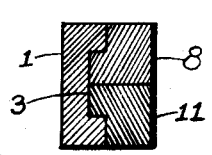
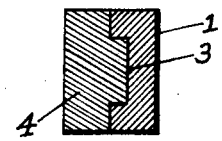
INVENTOR
ERWIN G. MENZENWERTH
By J. R. Cornwall, Atty.

UNITED STATES PATENT OFFICE.

ERWIN GUSTAVE MENZENWERTH, OF ST. LOUIS, MISSOURI.

PISTON RING.

1,406,054.  Specification of Letters Patent.  Patented Feb. 7, 1922.

Application filed March 24, 1921. Serial No. 455,032.

*To all whom it may concern:*

Be it known that I, ERWIN GUSTAVE MENZENWERTH, a citizen of the United States, residing at St. Louis, Missouri, have invented a certain new and useful Improvement in Piston Rings, of which the following is a full, clear, and exact description, such as will enable others skilled in the art to which it appertains to make and use the same, reference being had to the accompanying drawings forming part of this specification, in which—

Figure 1 is a plan view of the assembled ring.

Figure 2 is a plan view of one of the surface rings.

Figure 3 is a plan view of the other surface ring.

Figure 4 is a cross sectional view along the line 4—4 of Figure 1.

Figure 5 is a cross sectional view along the line 5—5 of Figure 1.

Figure 6 is a perspective view of one of the surface rings.

This invention relates to new and useful improvements in piston packing rings, the object being to make a ring that will operate effectively and yet is comparatively cheap to manufacture due to the simplicity of its parts.

In the drawings, 1 indicates an inner base or bull ring having a diagonal split or opening 2 and a circumferential groove 3 which extends around the entire outer periphery. Two cylinder bearing rings 4 and 5 have ribs 6 and 7 which fit in the groove 3. These cylinder bearing rings 4 and 5 are slightly longer than one-half the circumference of the base or bull ring and have overlapping ends 8, 9, 10, and 11 which form L-shaped projections. The ribs 6 and 7 of the cylinder bearing rings fit into the groove 3 of the bull ring and maintain the parts in their assembled positions.

A pin 12 is fixed in the bull ring so as to cooperate with the two L-shaped projections 8 and 11 to maintain a break joint and prevent the movement of the parts in relation to each other.

In applying a ring as shown herein to a piston, it is expanded until it can be slipped over the end of the piston and it is then forced downwardly until it enters one of the piston ring grooves in the piston. In order to insert the piston into the cylinder after the ring is positioned, it is necessary to contract the ring. The structure of the ring is such that when it is contracted or expanded, it maintains a regular shape, and when contracted in the cylinder, it will bear on the cylinder walls at all points uniformly.

This type of ring is very easily manufactured. It is cut preferably from a pot or cylinder of cast iron that has been machined to the size desired for the part being made. Both cylinder bearing rings may be cut from the same portion of the pot since they correspond in size and shape.

It is preferred to make this ring so that each of the cylinder bearing parts are two hundred forty degrees (240°) of a circle and the L-shaped projection on either end is approximately sixty degree (60°). This arrangement, together with the pin 12 which is fixed in the base or bull ring to maintain a fixed relation between the bull ring and the cylinder bearing ring, prevents any two joints from coinciding.

This construction provides for the uniform expansion of the various parts so that in operation this ring will make up for any irregularities in the cylinder or piston and at the same time maintain an efficient packing connection.

I claim:

1. The combination of a split bull-ring having a circumferential groove in its outer periphery and two cylinder bearing rings T-shaped in cross section and engaging said bull-ring, each of said cylinder bearing rings being divided circumferentially so as to provide L-shaped overlapping portions and each of said cylinder bearing rings being of a length exceeding one-half the circumference of the bull-ring whereby the parts remain in position when assembled, and means for retaining a break in the joints between the assembled rings.

2. The combination of a channel-shaped bull-ring, two T-shaped cylinder bearing rings, each less than one-half the diameter of the bull-ring and complementarily fitting therein, and both having overlapping portions extending beyond one-half the diameter of the bull-ring.

In testimony whereof I hereunto affix my signature this 19th day of March, 1921.

ERWIN GUSTAVE MENZENWERTH.